United States Patent
Hasan et al.

(10) Patent No.: US 9,792,049 B2
(45) Date of Patent: Oct. 17, 2017

(54) MEMORY SUBSYSTEM WITH WRAPPED-TO-CONTINUOUS READ

(71) Applicant: Cypress Semiconductor Corporation, San Jose, CA (US)

(72) Inventors: Qamrul Hasan, Santa Clara, CA (US); Shinsuke Okada, Kawashaki (JP); Yuichi Ise, Kanagawa (JP); Kai Dieffenbach, Egelsbach (DE); Kiyomatsu Shouji, Kanagawa (JP)

(73) Assignee: Cypress Semiconductor Corporation, San Jose, CA (US)

( * ) Notice: Subject to any disclaimer, the term of this patent is extended or adjusted under 35 U.S.C. 154(b) by 152 days.

(21) Appl. No.: 14/188,048

(22) Filed: Feb. 24, 2014

(65) Prior Publication Data
US 2015/0242129 A1    Aug. 27, 2015

(51) Int. Cl.
   G06F 3/06      (2006.01)
   G06F 12/02     (2006.01)
   G06F 12/0802   (2016.01)

(52) U.S. Cl.
   CPC .......... G06F 3/0611 (2013.01); G06F 3/0659 (2013.01); G06F 3/0685 (2013.01); G06F 12/0223 (2013.01); G06F 12/0802 (2013.01); G06F 2212/1024 (2013.01)

(58) Field of Classification Search
   CPC .............. G06F 3/0611; G06F 3/0659; G06F 2212/1024; G06F 12/0223; G06F 12/0802; G06F 3/0685
   USPC ....................................... 711/114
   See application file for complete search history.

(56) References Cited

U.S. PATENT DOCUMENTS

| | | | |
|---|---|---|---|
| 2003/0018845 A1* | 1/2003 | Janzen ............ | G11C 7/1018 711/1 |
| 2005/0268027 A1* | 12/2005 | Katsuki ............ | G06F 13/1678 711/105 |
| 2015/0046773 A1* | 2/2015 | Atobe .............. | G06F 11/1044 714/768 |

* cited by examiner

*Primary Examiner* — David X Yi
*Assistant Examiner* — Zubair Ahmed

(57) ABSTRACT

Disclosed herein are system, method, and computer program product embodiments for accessing data of a memory. A method embodiment operates by receiving one or more requests for data stored across at least a first memory area and a second memory area of a memory. The method continues with performing, by at least one processor, a wrapped read of data within a first memory area of the memory. The method then performs, by the at least one processor, a continuous read of data within a second memory area of the memory, the second memory area being adjacent to the first memory area. The continuous read starts at a first boundary of the second memory area, and is performed automatically after the wrapped read of data within the first memory area.

13 Claims, 6 Drawing Sheets

US 9,792,049 B2

MEMORY SUBSYSTEM WITH WRAPPED-TO-CONTINUOUS READ

BACKGROUND

Commercial database systems rely on caching techniques to improve performance, Caches are often implemented to support memory that can be accessed quickly, such as random access memory (RAM), as opposed to storage that takes longer to access, such as disk-based storage. Caches typically store frequently used data and reduce the time needed by a database system to access a data page.

In general, memory controller access to non-volatile memory devices initiates read or write operations with the assertion of a chip select signal per each read or write transaction request from a bus master. The chunks of data to be read from the memory and used to fill one or more cachelines of the cache may be stored across more than one memory area of the memory, which typically requires issuing separate read commands for each chunk of data to be written into an associated cacheline. The need for multiple read requests to the memory increases the latency and access time to the memory.

SUMMARY

Provided herein are system, method, and/or computer program product embodiments, and/or combinations and sub-combinations thereof, for accessing data from a plurality of memory devices.

An embodiment includes a computer implemented method for accessing a cache.

The method operates by receiving one or more requests for data stored across at least a first memory area and a second memory area of a memory. The method continues with performing, by at least one processor, a wrapped read of data within a first memory area of the memory. The method then performs, by the at least one processor, a continuous read of data within a second memory area of the memory, the second memory area being adjacent to the first memory area. The continuous read starts at a first boundary of the second memory area, and is performed automatically after the wrapped read of data within the first memory area.

Another embodiment includes a system. The system includes a plurality of memory devices and a memory controller coupled to the plurality of memory devices. The memory controller is designed to receive one or more requests for data stored across at least a first memory area and a second memory area of the plurality of memory devices. The memory controller also performs a wrapped read of data within a first memory area of the memory. The memory controller is also designed to perform a continuous read of data within a second memory area of the memory, the second memory area being adjacent to the first memory area. The continuous read starts at a first boundary of the second memory area. The plurality of memory devices are designed such that, after performing the wrapped read of data within the first memory area, the continuous read of data is automatically started at the first boundary of the second memory area.

A further embodiment includes a tangible computer-readable device having instructions stored thereon that, when executed by at least one computing device, cause the computing device to perform operations. The operations include receiving one or more requests for data stored across at least a first memory area and a second memory area of a memory. The operations further include performing a wrapped read of data within a first memory area of the memory. The operations further include a continuous read of data within a second memory area of the memory, the second memory area being adjacent to the first memory area. The continuous read starts at a first boundary of the second memory area, and is performed automatically after the wrapped read of data within the first memory area.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It should be noted that the various embodiments and their associated figures described herein are provided as examples. As such, reference to particular memory addresses, number of cachelines, and labels given to various components or generated signals are not intended to limit the scope or spirit of the invention as would be understood by one having ordinary skill in the art.

Figure 1:
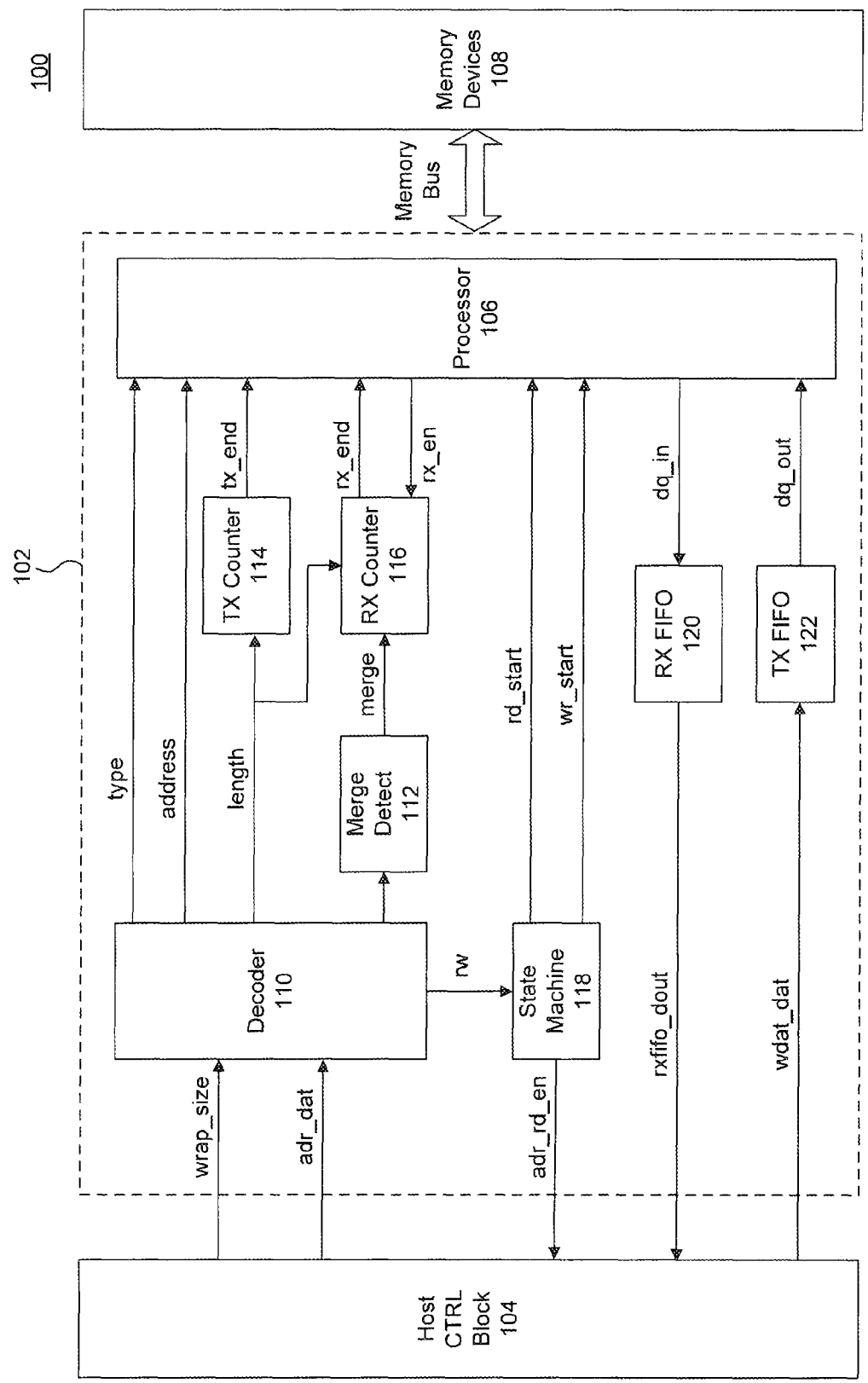
FIG. 1 is a block diagram of a memory system that includes various components of a memory controller, according to an example embodiment.

FIG. 1 is a block diagram of an example memory system 100 that includes a memory controller 102 receiving and transmitting signals between a host CTRL block 104 and a plurality of memory devices 108, according to an embodiment. Host CTRL block 104 may also be a part of memory controller 102, according to some embodiments. Host CTRL block 104 includes electrical circuits and/or components capable of receiving one or more requests from a host CPU (not shown) across the host bus for access to a plurality of memory devices 108. In another embodiment, host CTRL block 104 may receive one or more requests from a cache memory controller to access data with which to fill portions of a cache. The data access may involve one or more read requests to retrieve data stored in one or more of the plurality of memory devices, or the data access may involve one or more write requests to store data in one or more of the plurality of memory devices. In another example, the access may involve erasing data stored in one or more of the plurality of memory devices. The host CTRL block 104, receives the one or more data requests and provides one or more data signals to memory controller 102.

The data signals provided to memory controller 102 may include a wrap_size signal that designates the byte size of the memory cachelines to be accessed. For example, and without limitation, the byte size may be either 32 or 64 bytes. The data signals also include an adr_dat signal that includes the addresses for the data to be accessed. The adr_dat signal may include data associated with a starting address for the data to be accessed and a length of the data. If the request from the CPU is a write request, the data signals transmitted to memory controller 102 also include a wdat_dat signal that includes the data to be written to the memory.

Memory controller 102 receives the various data signals provided from Host CTRL Block 104 and appropriately controls access to plurality of memory devices 108 via a memory processor 106, according to an embodiment. Memory controller 102 may include a decoder 110, a state machine 118, a TX counter 114, a RX counter 116, an RX FIFO 120, a TX FIFO 122, and a processor 106. According to an embodiment, memory controller 102 includes a merge detect module 112.

Decoder 110 may include electrical circuits and/or components capable of generating appropriate memory address and length signals as well as a rw signal indicating whether a data read or data write is occurring. Decoder 110 may also be capable of generating a type signal that indicates whether the data read of a memory area in plurality of memory devices 108 is to be a wrapped read or a continuous read. The differences between wrapped reads and continuous reads is described in more detail later with reference to FIGS. 2 and 3.

State machine 118 may include electrical circuits and/or components capable of transferring access from plurality of memory devices 108 to the CPU host, and controlling the timing of the when data is read to or written from plurality of memory devices 108. For example, state machine 118 may generate a rd_start signal to begin a data read procedure from plurality of memory devices 108 or a wr_start signal to begin a data write procedure to plurality of memory devices 108. State machine 118 may also return an adr_rd_en signal when all of the requested data has been read (or written).

TX counter 114 and RX counter 116 may include electrical circuits and/or components capable of counting down the length of data to be written to or read from a given memory area from plurality of memory devices 108. For example, TX counter 114 may generate a tx_end signal when the counted length of the data to be written to a given memory area reaches zero. In another example, RX counter 116 may generate a rx_end signal when the counted length of the data to be read from a given memory area reaches zero. Additionally, RX counter 116 may also receive an rx_en signal that indicates when memory is read from the given memory area.

RX FIFO 120 and TX FIFO 122 may include electrical circuits and/or components capable of buffering data passed between plurality of memory devices 108 and Host CTRL block 104. For example, RX FIFO 120 may receive data to be read (dq_in) from plurality of memory devices 108 and provide a temporary buffer of the data before transmitting to Host CTRL block 104 as rxfifo_dout. Similarly, TX FIFO 122 may receive data to be written (wdat_dat) from Host CTRL block 104 and provide a temporary buffer of the data before transmitting to processor 106 as dq_out. In one example, the buffering of the data causes a delay in the transmission of the data, or changes a signal characteristic of the data.

Processor 106 may be designed to control at least the various components of memory controller 102. For example, processor 106 receives various signals output from the components of memory controller 102, and in turn communicates with plurality of memory devices 108 via a Memory Bus. Processor 106 may be further designed to provide data read from plurality of memory devices as dq_in. According to an embodiment, processor 106 performs designated bus protocols between plurality of memory devices 108 and memory controller 102.

According to an embodiment, merge detect module 112 includes electrical circuits and/or components capable of determining when data is being accessed across a plurality of memory areas that are adjacent to one another. Merge detect module 112 may use the adr_dat from the received one or more read requests to determine if the data requested exists over memory areas with adjacent addresses in plurality of memory devices 108. In one example when data to be accessed exists in two memory addresses adjacent to one another, merge detect module 112 asserts the merge signal upon the completion of reading data from a first memory area. The assertion of merge signal causes RX counter 116 to be updated with the length of the second memory area, and the read operation proceeds with the second memory area. Multiple adjacent memory areas of plurality of memory devices 108 may be read in this way. In an embodiment, this procedure of reading data between a plurality of adjacent memory areas occurs without the need for memory controller 102 to perform multiple read requests of the data. For example, although multiple read requests are received by memory controller 102 from Host CTRL block 104 to access data across multiple memory areas, merge detect module 112 is designed to merge these multiple read requests into a single read request of the data performed by the components of memory controller 102. Reducing the number of read requests reduces the latency for accessing the data on plurality of memory devices 108. In another example, merge detect module 112 is designed to merge the multiple read requests into two read requests: one read request for reading a first memory area using a wrapped read, and the other read request for reading any additional adjacent memory areas using a continuous read. The differences between wrapped reads and continuous reads are described in more detail below with reference to FIGS. 2 and 3.

Figure 2B:
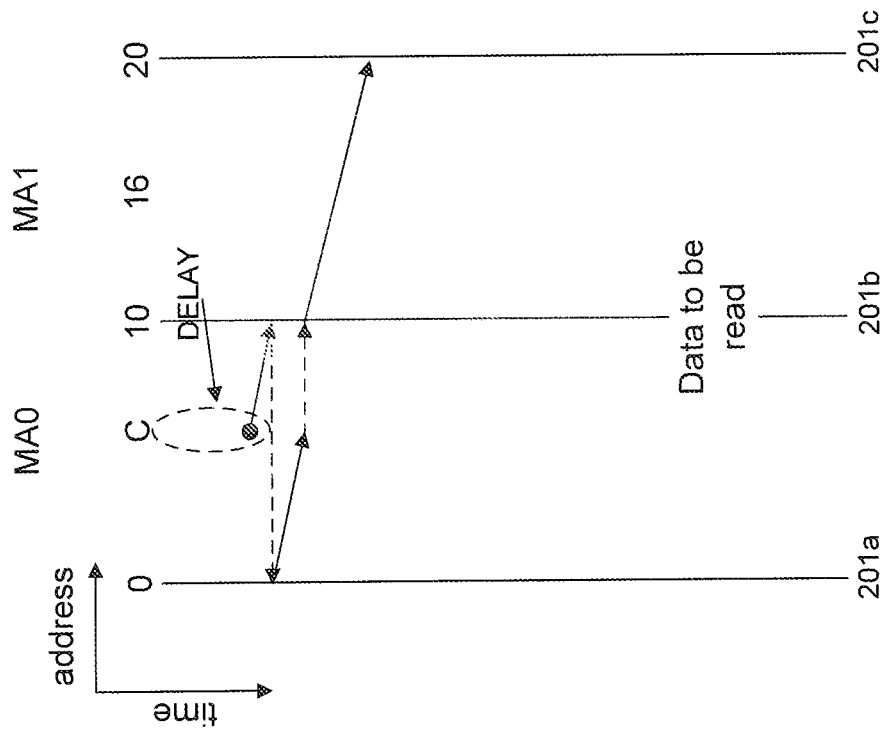
FIG. 2B illustrates a data read of memory, according to an example embodiment.
Figure 2A:
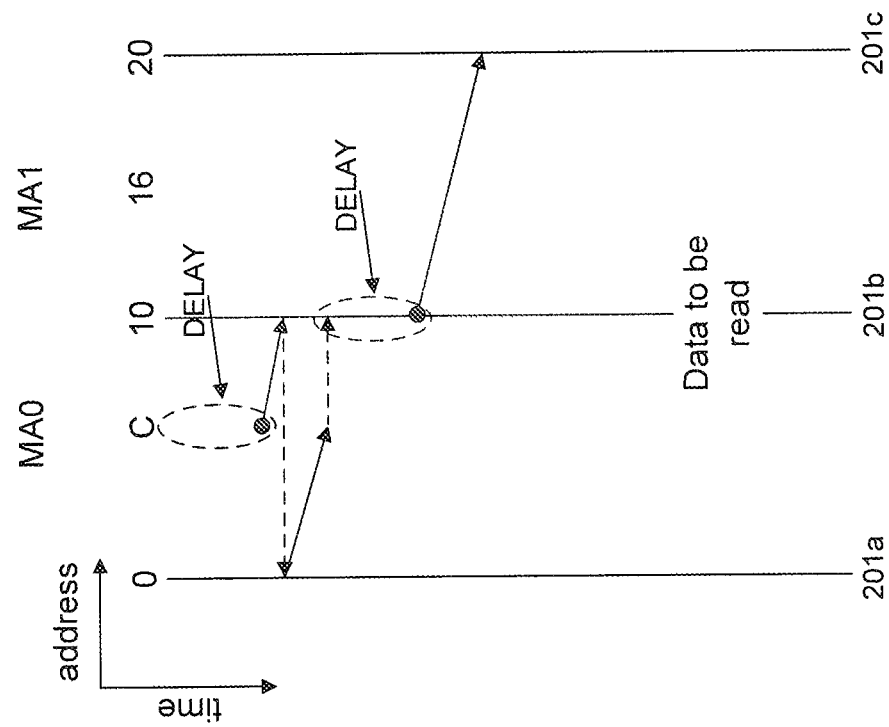
FIG. 2A illustrates a data read of memory.

FIG. 2A illustrates a method of reading data across more than one memory area. Each memory area may be separated by a wrap boundary 201. In an embodiment, each memory area contains data to be written to an associated cacheline of a memory cache. In this example, the data to be accessed starts at address C in a first memory area MA0 and extends to address 16 in a second memory area MA1 (addresses are given in hexadecimal format). If data is to read from address C of MA0 to address 16 of MA1, the data is accessed beginning at address C (following a delay from receiving the request to read the data) and reading forward until a wrap boundary 201b is reached. Each wrap boundary 201a-c may form a beginning or an end of a given memory area. Furthermore, wrap boundary 201b may act as both the end of a first memory area (MA0) and the beginning of an adjacent second memory area (MA1). Each of the black dots may represent the start of a new access to read data. Starting a read of data somewhere within a memory area is known as an unaligned read, while aligned reads start at a wrap boundary.

Once wrap boundary 201b has been reached, data is read beginning back at wrap boundary 201a of MA0. This is known as a wrapped read of data. Once the wrapped read of MA0 has completed, a chip select signal is de-asserted and must be re-asserted to begin reading the next memory area MA1 starting at wrap boundary 201b. This process, along with other operations performed by the memory controller to initialize the reading of data in the next memory area MA1, causes a delay as indicated in FIG. 2A. Once the address for reading the data has been properly initialized, data is read in MA1 starting at wrap boundary 201b and continuing to wrap boundary 201c. Each read operation of MA0 and MA1 is considered to be a wrapped read, with the wrapped read of MA0 being unaligned and the wrapped read of MA1 being aligned.

FIG. 2B illustrates a method of reading data across more than one memory area, according to an embodiment. The data to be accessed starts at address C in memory area MA0 and extends to address 16 in memory area MA1. Each memory area MA0 and MA1 may include 32 bytes or 64 bytes of data. Other data sizes are possible as well, in an embodiment, each memory area contains data that is written to an associated cacheline of a cache.

According to an embodiment, a wrapped read occurs starting at address C of MA0, and wrapping back to wrap boundary 201a when wrap boundary 201b is reached. Then, when all of the data of MA0 has been read, data is automatically read starting at wrap boundary 201b and continuously on to wrap boundary 201c. In this way, all of the data of MA1 is read in a continuous read starting at its wrap boundary 201b and ending at its wrap boundary 201c. Data is read between both memory areas MA0 and MA1 without the delay shown in FIG. 2A, according to an embodiment.

Referring back to FIG. 1, merge detect module 112 may detect that the data to be accessed lies across two adjacent memory areas (MA0 and MA1 of FIG. 2B). According to one example, merge detect module 112 merges the two received read requests (for data of MA0 and MA1) into a single read request. The single read request updates the length of the data to be read, to stretch across both memory areas and does not require two separate read operations to be performed by memory controller 102, according to an embodiment. As such, there is substantially no delay shown in FIG. 2B between reading data from MA0 and reading data from MA1. In one example, merge detect module 112 does not wait until all of the data is read from MA0 to merge the one or more received read requests into a single read request for data across MA0 and MA1.

Figure 3A:
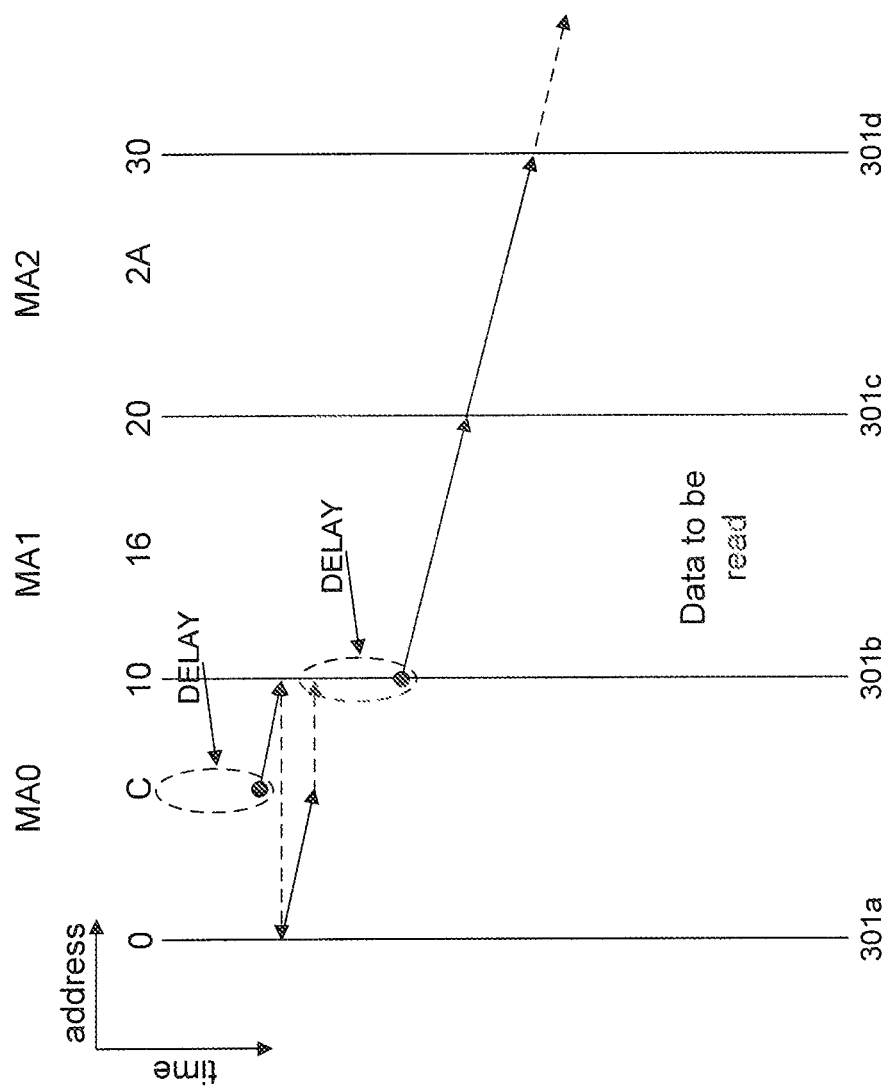
FIGS. 3A and 3B illustrate reading data across a plurality of memory areas, according to example embodiments.
Figure 3B:
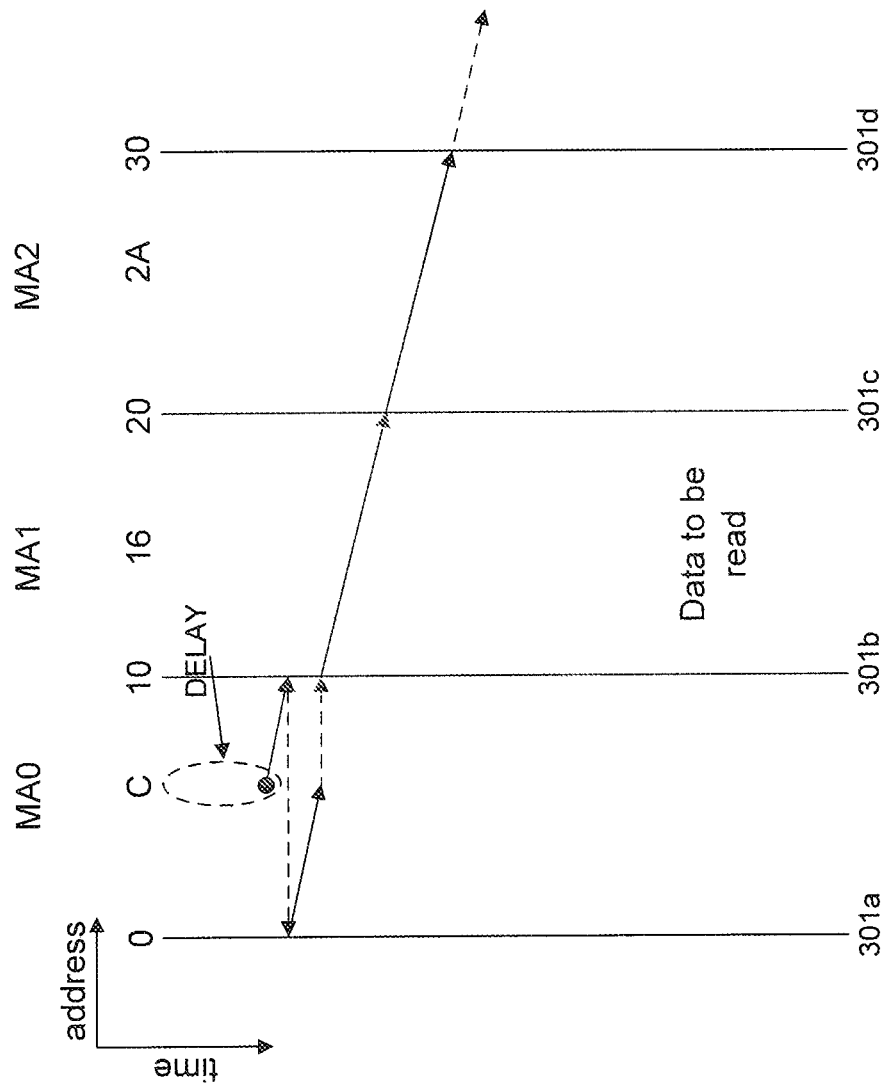

The continuous read of data may extend to more than one memory area beyond MA0, according to an embodiment. FIGS. 3A and 3B illustrate examples where data is to be read across three memory areas, according to some embodiments. In FIG. 3A, a delay is still shown between the reading of data of MA0 and MA1, however, there is no delay between reading the data of additional adjacent memory areas (e.g., MA1 to memory area MA2), according to an embodiment. The scenario illustrated in FIG. 3A may occur when using merge detect module 112 to merge multiple read requests into two read requests, one for the first memory area MA0, and the other to read any additional adjacent memory areas. This may be performed with particular memory structures that cannot begin their read at the next memory area after performing a wrapped read of the current memory area. FIG. 3B illustrates a scenario using memory that is capable of immediately and automatically reading at the next wrap boundary following a wrapped read of a given memory area, according to an embodiment.

In both FIGS. 3A and 3B, the data to be accessed starts at address C of memory area MA0 and extends to address 2A of memory area MA2. A wrapped read occurs in MA0 starting at address C and wrapping back at wrap boundary 301b. Once the wrapped read completes and has returned to address B, a continuous read of the next adjacent memory area MA1 commences at wrap boundary 301b, according to an embodiment. The continuous read commences after a delay, and a new access request, as shown in FIG. 3A, but commences almost instantly as shown in FIG. 3B. Since the data to be accessed continues beyond MA1, the same continuous read also continues past wrap boundary 301c and reads the data of MA2, according to an embodiment.

Referring to FIG. 1, merge detect module 112 may detect when a continuous read across multiple adjacent memory areas is needed after a wrapped read of the first memory area. In another example, merge detect module 112 detects when multiple read commands for adjacent memory areas may be merged into one or two read commands after receiving the multiple read commands and before any data is read from the memory areas. In one embodiment, merge detect module 112 merges the received read commands into a single read command that performs the wrapped read of the first memory area followed by the continuous reads of one or more adjacent memory areas (as illustrated in FIG. 3B.) In another embodiment, merge detect module 112 merges the received read commands into a first read command to perform the wrapped read of the first cacheline and a second read command to perform the continuous reads of one or more adjacent memory areas (as illustrated in FIG. 3A.)

Figure 4:
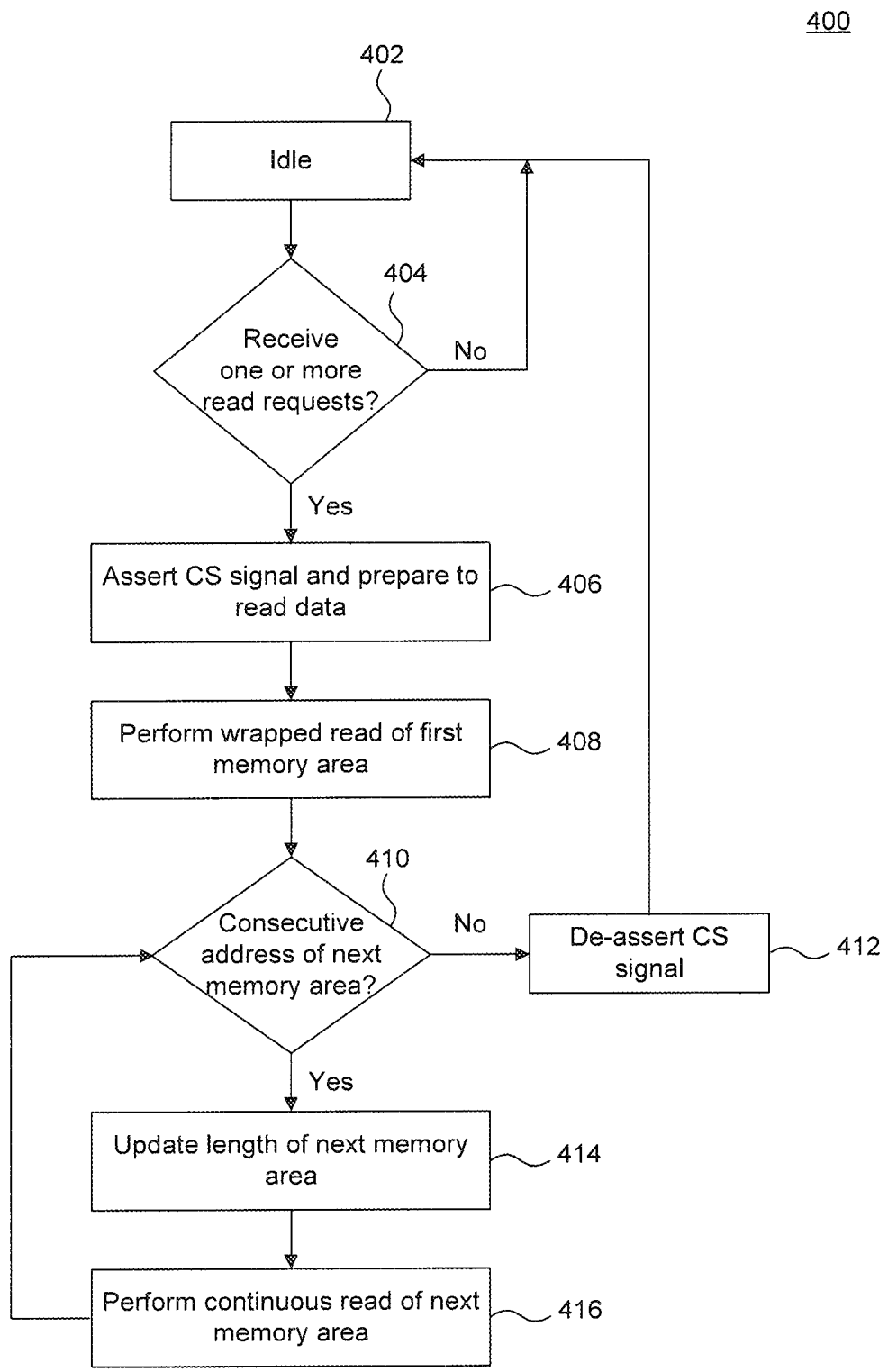
FIG. 4 illustrates an example flowchart for reading data from a plurality of memory devices, according to an embodiment.

FIG. 4 illustrates an example method 400 for reading data across a plurality of memory areas, according to an embodiment. In an example, the various steps of method 400 may be performed by the components illustrated within memory controller 102 of FIG. 1. It should be understood that other steps beyond the ones illustrated may also be performed.

At block 402, the memory controller is idle and awaiting a command.

At block 404, the memory controller checks if one or more read requests for data has been received. If not, it continues to wait for a command at block 402. If it does receive one or more read requests, method 400 continues to block 406. In an example, each read request received is for a wrapped read of a given memory area.

At block 406, a chip select (CS) signal is asserted and data is prepared to be read from plurality of memory devices 108. This preparation may involve the assertion of various signals within memory controller 102 as described previously with reference to FIG. 1. In an embodiment, merge detect module 112 within memory controller 102 may merge the one or more requests for data into either a single request for data or two requests for data, if the requested data lies across adjacent memory areas within plurality of memory devices 108.

At block 408, a wrapped read of the data in a first memory area is performed, according to an embodiment. The wrapped read may start at a first memory address of the data to be accessed. The wrapped read may then continue to a second wrap boundary of the first memory area, and continue reading from a first wrap boundary of the first memory area.

At block 410, a decision is made depending on whether data is to continue to be read from an adjacent memory area, according to an embodiment. The determination may be made by merge detect module 112 after performing the wrapped read as described in block 408, or the determination may be made by merge detect module 112 after receiving the one or more read requests as described in block 404. If the next memory area to be read is not adjacent, then method 400 continues to block 412 where the chip select signal (CS) is de-asserted. Method 400, then returns to an idle state at block 402 to wait for another read request.

However, if the next memory area to be read is adjacent as determined at block 410, then method 400 continues on to block 414, according to an embodiment. At block 414, a length of the next memory area to be accessed is updated, for example, by a counter. In an embodiment, the length designates each bit of data to be accessed within the next memory area, since all of the data within the next memory area will be read. The length may also be updated to incorporate the data of more than one adjacent memory area to be read. For example, if read requests are received for three additional memory areas that are adjacent to one another, then the length may be updated once to incorporate the reading of all three memory areas. In another embodiment, the length is updated for the next memory area to be read after reading a current memory area.

At block 416, a continuous read of the next memory area is performed, according to an embodiment. The continuous read may begin at a first wrap boundary of the memory area being accessed and end at a second wrap boundary of the memory area being accessed. The continuous read may be an aligned read of the data within the memory area. According to an embodiment, the continuous read accesses the entire memory area, even if the requested data ends at an address within the memory area. Once the memory area has been read, method 400 returns to block 410 to determine if the requested data lies in any further adjacent memory areas, according to an embodiment.

In another embodiment, the continuous read in block 416 reads through all adjacent memory areas holding the requested data and not just one memory area at a time. In this situation, after reading through all adjacent memory areas, there are no further consecutive memory areas to access, and method 400 continues to block 412.

Example Computer System

Figure 5:
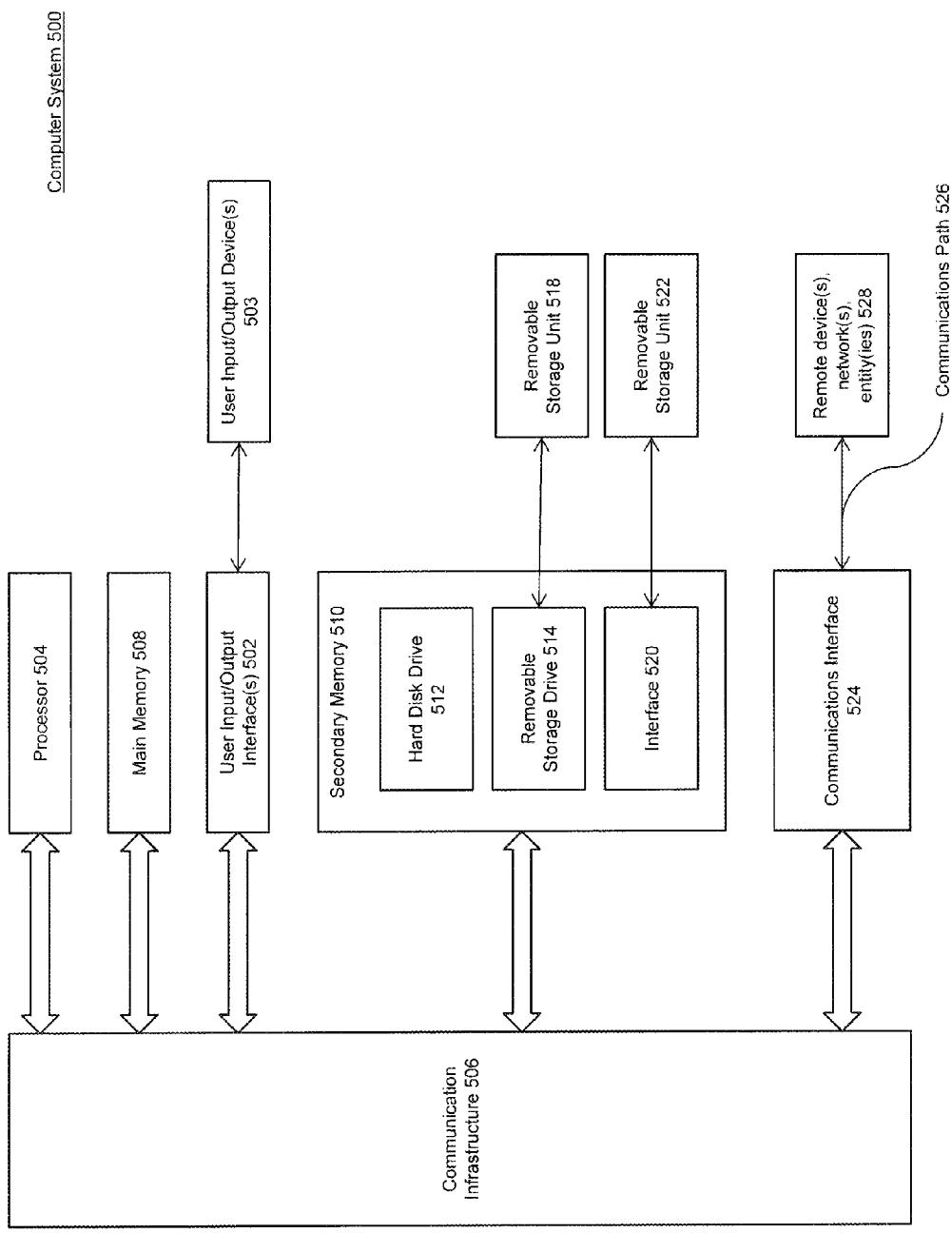
FIG. 5 is an example computer system useful for implementing various embodiments.

Various embodiments may be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for accessing data, comprising:
    receiving two or more requests for data stored across at least a first memory area and a second memory area of a memory, wherein the two or more requests for data are received from a CPU of a host;
    responsive to determining that the first memory area is adjacent to the second memory area, merging the received two or more requests for data into a single request for data across at least the first memory area and the second memory area, and updating a read length associated with the single request such that the updated read length encompasses at least the first memory area and the second memory area;
    performing, by at least one processor, a wrapped read of data within the first memory area of the memory;
    performing, by the at least one processor responsive to the single request and using the updated read length, a continuous read of data within the second memory area of the memory, the second memory area being adjacent to the first memory area, wherein the continuous read starts at a first boundary of the second memory area, and is performed automatically after reading a final address of the wrapped read of data within the first memory area; and
    controlling a timing of the performing of the wrapped read and a timing of the performing of the continuous read using a state machine coupled to the at least one processor.

2. The computer implemented method of claim 1, further comprising:
    continuing the continuous read of data within one or more additional adjacent memory areas of the memory, wherein the continuous read of data within one of the one or more additional adjacent memory areas occurs automatically after the continuous read of data within a previous adjacent memory area.

3. The computer implemented method of claim 1, further comprising:
    determining if the requested data is stored across a plurality of adjacent memory areas of the memory.

4. The computer implemented method of claim 1, wherein the receiving comprises receiving the two or more requests for data from a cache memory controller.

5. The computer implemented method of claim 4, further comprising transmitting, by the at least one processor, at least the requested data to the cache memory controller.

6. The computer implemented method of claim 5, wherein the data within the first memory area is written to a first cacheline of a cache associated with the cache memory controller and the data within the second memory area is written to a second cacheline of the cache.

7. A system comprising:
    a plurality of memory devices;
    a memory controller comprising
        a decoder configured to receive two or more requests for data stored across at least a first memory area and a second memory area of the plurality of memory devices, wherein the two or more requests for data are received from a CPU of a host;
        a merge detect module configured to determine that the first memory area is adjacent to the second memory area and responsively merge the received two or more requests for data into a single request for data across at least the first memory area and the second memory area, and update a read length associated with the single request such that the updated read length encompasses at least the first memory area and the second memory area;
    a processor configured to:
        perform a wrapped read of data within the first memory area, and
        responsive to the single request and using the updated read length, perform a continuous read of data within the second memory area, wherein the continuous read starts at a first boundary of the second memory area; wherein after reading a final address of the wrapped read of data within the first memory area, the processor automatically starts the continuous read of data at a first boundary of the second memory area.

8. The system of claim 7, wherein the processor is further configured to perform a continuous read of data within one or more additional adjacent memory areas.

9. The system of claim 7, wherein the memory controller is configured to receive the two or more requests for data from a cache memory controller.

10. The system of claim 9, wherein the memory controller is further configured to transmit at least the requested data to the cache memory controller.

11. The system of claim 10, wherein the cache memory controller is configured to write the data within the first memory area to a first cacheline of a cache and to write the data within the second memory area to a second cacheline of the cache.

12. The system of claim 7, wherein the memory controller further comprises a counter configured to count down a length of the read length.

13. A tangible computer-readable device having instructions stored upon that, when executed by at least one computing device, causes the at least one computing device to perform operations comprising:

receiving two or more requests for data stored across at least a first memory area and a second memory area of a memory, wherein the two or more requests for data are received from a CPU of a host;

merging the received two or more requests for data into a single request for data across at least the first memory area and the second memory area, and updating a read length such that the updated read length encompasses at least the first memory area and the second memory area;

based on the single request,
performing a wrapped read of data within the first memory area of the memory; and
performing a continuous read of data within the second memory area of the memory using the updated read length, the second memory area being adjacent to the first memory area, wherein the continuous read starts at a first boundary of the second memory area, and is performed automatically after reading a final address of the wrapped read of data within the first memory area; and controlling a timing of the performing of the wrapped read and a timing of the performing of the continuous read using a state machine.

* * * * *